Jan. 9, 1923. 1,441,736.
S. METZSCH.
PIPE COUPLING.
FILED SEPT. 7, 1922.

Inventor
Soren Metzsch.
By Arthur H. Sturges.
Attorney

Patented Jan. 9, 1923.

1,441,736

UNITED STATES PATENT OFFICE.

SOREN METZSCH, OF SPRINGFIELD, NEBRASKA, ASSIGNOR OF ONE-THIRD TO JAMES KNAPP, OF BEATRICE, NEBRASKA, AND ONE-THIRD TO ROY B. HARBERG, OF SPRINGFIELD, NEBRASKA.

PIPE COUPLING.

Application filed September 7, 1922. Serial No. 586,637.

*To all whom it may concern:*

Be it known that I, SOREN METZSCH, a citizen of the United States, residing at Springfield, in the county of Sarpy and State of Nebraska, have invented certain new and useful Improvements in Pipe Couplings, of which the following is a specification.

The present invention relates to pipe couplings and pipe construction adapted particularly for reinforcing concrete pipe used for sewers and drains.

Heretofore in concrete pipe construction the sections of the pipe frequently twist or sag out of the line, particularly when the pipe is embedded in soft soil, quick sand and the like, with the result that the foundation soil becomes sucked or fallen away from the bottom and sides of the pipe permitting the latter to break at its joints and become out of line; thus permitting the pipe to leak and impeding the flow through the pipe.

An object of this invention, therefore, is to overcome these difficulties by providing a concrete pipe which will hold together at its joints under these conditions and which may be quickly and easily assembled to provide a substantially unitary pipe throughout all of its various joints and sections.

Another object of the invention is to provide a pipe coupling for concrete pipes which holds the sections rigidly together to prevent obstruction and leakage in the pipe.

The invention still further aims at the provision of a pipe coupling possessing the above characteristics and which at the same time will serve as an additional reinforcement for the cementitious pipe.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of a section of concrete sewer pipe embodying the reinforcement and couplings of this invention.

Figure 1:
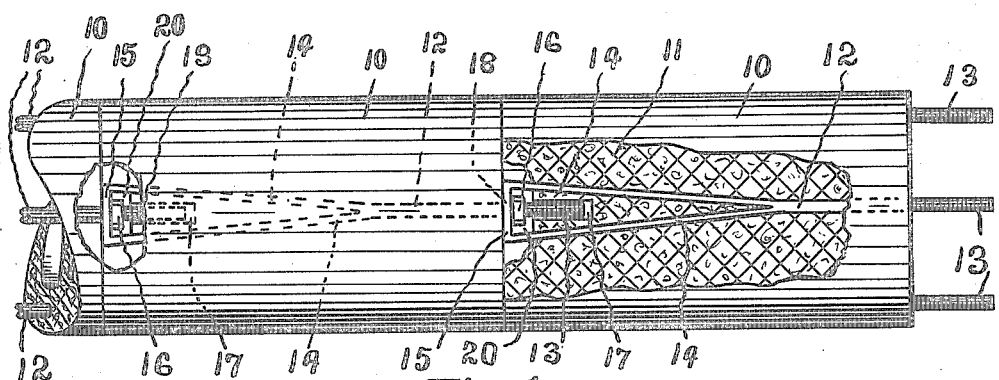

Referring to the drawing, 10 designates a section of pipe adapted for sewer and drains and which may be constructed of a body of concrete and provided with a reinforcement 11 in the form of a coarse wire screen as shown in the present instance. The pipe, as shown in Figure 1, may be made up of any desired number of sections 10 and each section is of the same construction for interlocking engagement at opposite ends with one another.

Figure 2:
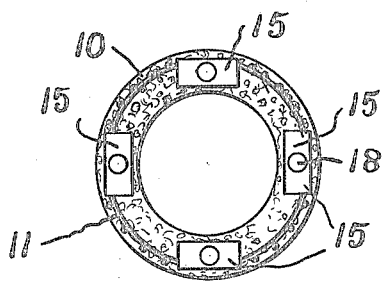
Figure 2 is an end elevation of one end of a pipe section constructed according to the present invention.
Figure 3:
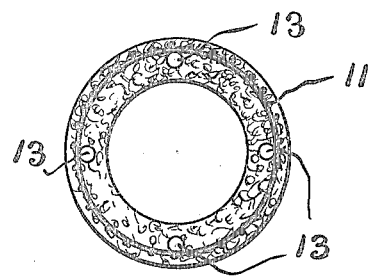
Figure 3 is an opposite end view of the same.

Embedded in the pipe section 10 are a number of reinforcing and connecting rods 12 which have screw threaded shanks 13 on their outer ends adapted to extend lengthwise from one end of the section 10 and which at their other ends are enlarged to form anchoring heads embedded in the concrete body. The anchoring heads, as shown in the present instance, may be constructed by dividing the inner ends of the rod 12 and the diverging fork arms 14 are connected together at their inner ends by a bridge piece 15 forming a yoke, and the bridge piece 15 is apertured for slidably receiving therethrough the shank 13 of an adjacent pipe section 10. Each shank 13 has a nut 16 adapted to be threaded thereon and to lie within the yoke 15 and bear against the inner side thereof for drawing the shank 13 into the head of the coupling bar or rod and for holding it in adjusted position. As shown in Figure 1, the body 10 of the pipe section is molded or cast with a recess 17 in line with the opening 18 of the yoke 15 so that the shank 13 may be received in the opening 17 as the nut 16 is turned up on the shank. The walls of the opening 17 are adapted to snugly embrace the inwardly projecting end of the shank 13 to support the latter against lateral bending or movement which may take place during any tendency for the pipe sections to settle or separate. The yokes or bridge pieces 15 are embedded in the body of concrete flush with one end of the pipe section, as shown in Figures 1 and 2, and the pipe section is provided with an opening or pocket 20 extending inwardly from the peripheral surface of the pipe section to receive the nut 16 therein, and is of sufficient size to also receive a wrench or other suitable tool by means of which the nut 16 may be turned.

Figure 4:
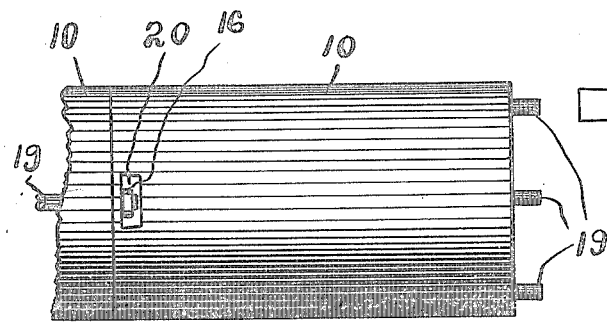
Figure 4 is a side elevation of a portion of pipe, showing a slight modification in the coupling and reinforcing means.
Figure 5:
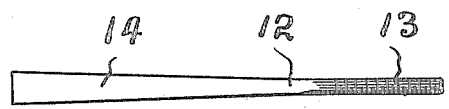
Figure 5 is a detail side elevation of one of the coupling and reinforcing bars.
Figure 6:
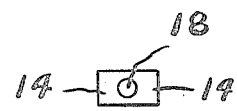
Figure 6 is an outer end view of the same.

In Figure 4 is shown a slight modification wherein the threaded shanks 19 of the coupling and reinforcing bars or rods are relatively short and terminate in the pockets or openings 18. In this construction the recesses 17 are omitted. This modified construction is adapted for relatively light pipes of small diameter, but where the pipes are heavy and of large diameter it may be found more desirable to have the pockets 17 and the long shanks to prevent any possible sagging or displacement of the coupling bars.

In assembling a number of pipe sections constructed according to this invention the same are placed end to end with the shanks 13 of one section projecting through the yokes, and the nuts 16 are fitted in the pockets 20 and over the ends of the shanks 13. As the nuts 16 are drawn up on the shanks, the latter are fed into the pockets 17 until the pipe sections are drawn into tight relation to prevent leakage and to readily support one section upon the other.

In the formation of the pockets or recesses 17 and 18 core blocks or plugs may be used and which are withdrawn after the pipe sections have set. After the couplings are made the pockets or recesses 18 are preferably filled with a soft cement to protect the shanks 13 and nuts 16 from contact with moisture and to thus preserve the connections indefinitely.

I do not wish to be restricted to the size, form, and proportions of the various parts, and obviously changes could be made in the construction herein described without de departing from the spirit of the invention, it being only necessary that such changes fall within the scope of the appended claims:

What is claimed is:

1. In a pipe coupling, a pipe section of concrete, a plurality of reinforcing rods embedded in the concrete and having threaded ends projecting beyond one end of the pipe section and having enlarged heads on their other ends embedded in the opposite end of the pipe section, said enlarged heads of the rods having openings therein for the reception of the threaded shanks of an adjacent pipe section and nuts carried in said heads adapted to engage the threaded shanks for binding a plurality of the pipe sections in end to end relation, the adjacent ends of the sections having apertures therein leading to the openings in said heads whereby access may be had to the nuts.

2. In a pipe coupling, a concrete pipe section, a plurality of lengthwise extending rods embedded in the pipe section having apertured hollow heads on their inner ends embedded flush with one end of the pipe section and having threaded shanks on their other ends projecting beyond the other end of the pipe section, the shanks of one pipe section being adapted to engage in the apertures of the heads in the second pipe section, and coupling nuts carried in said hollow heads adapted to be drawn up upon the shanks for drawing the same into the heads and binding the pipe sections together, the adjacent ends of the sections having apertures therein leading to the openings in said heads whereby access may be had to the nuts.

3. In a pipe coupling a concrete pipe section, a plurality of lengthwise extending coupling rods embedded in the pipe section, each rod having a threaded shank on one end adapted to project from one end of the pipe section and having its other end forked with the arms of the fork diverging and provided with a bridge piece connecting the free ends of the fork, said bridge piece having an aperture therethrough adapted to receive the threaded shank of an adjacent pipe section, a coupling nut carried in the fork against the inner side of the bridge piece and adapted to be threaded over the adjacent shank for drawing the latter into the fork, said concrete pipe section having a recess in its outer side opening into the fork through which access may be had to the nut for manipulating the same.

4. In a pipe coupling, a concrete pipe section, a wire screen embedded in the pipe section for reinforcing the same, a plurality of lengthwise extending bars embedded in the pipe section and having threaded shanks on one end projecting beyond one end of the pipe section, each bar having its other end forked with the arms of the fork diverging and having a bridge piece connecting the outer ends of the fork arms and lying flush with the opposite end of the pipe section, said bridge pieces being apertured for receiving the threaded shanks of an adjacent pipe section threrethrough and the pipe section having lengthwise extending pockets co-axial with the openings in the bridge pieces for receiving said threaded shanks and supporting the same against lateral swinging, the pipe section also having radially extending openings therein leading from the inner sides of the bridge pieces, and nuts operable in said last named openings against the inner sides of the bridge pieces for threaded engagement over the shanks to draw the same into said lengthwise extending openings of the pipe section.

In testimony whereof, I have affixed my signature in presence of two witnesses.

SOREN METZSCH.

Witnesses:
JOHN A. YOUNG,
W. C. HEINTZELMAN.